Patented May 31, 1932

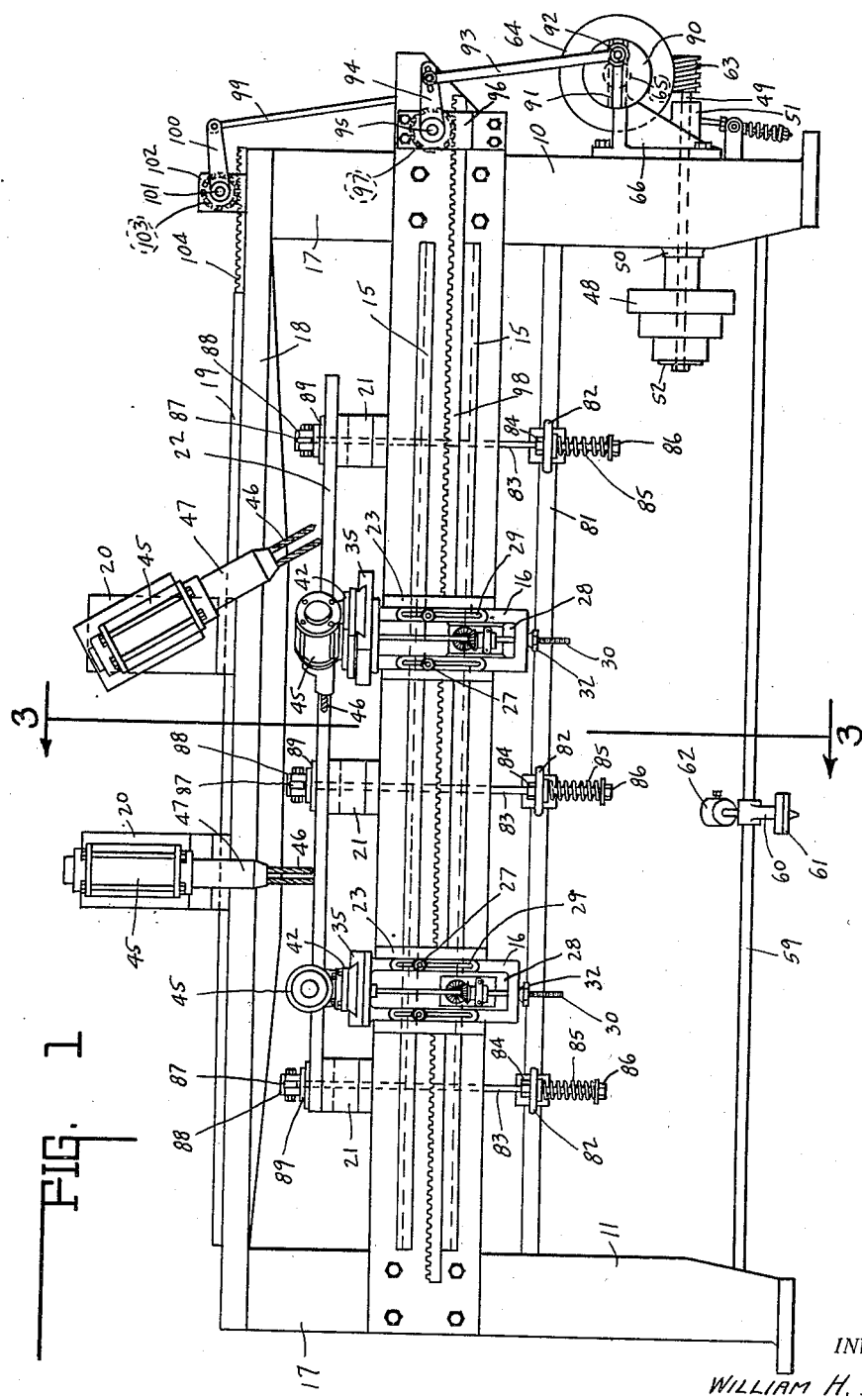

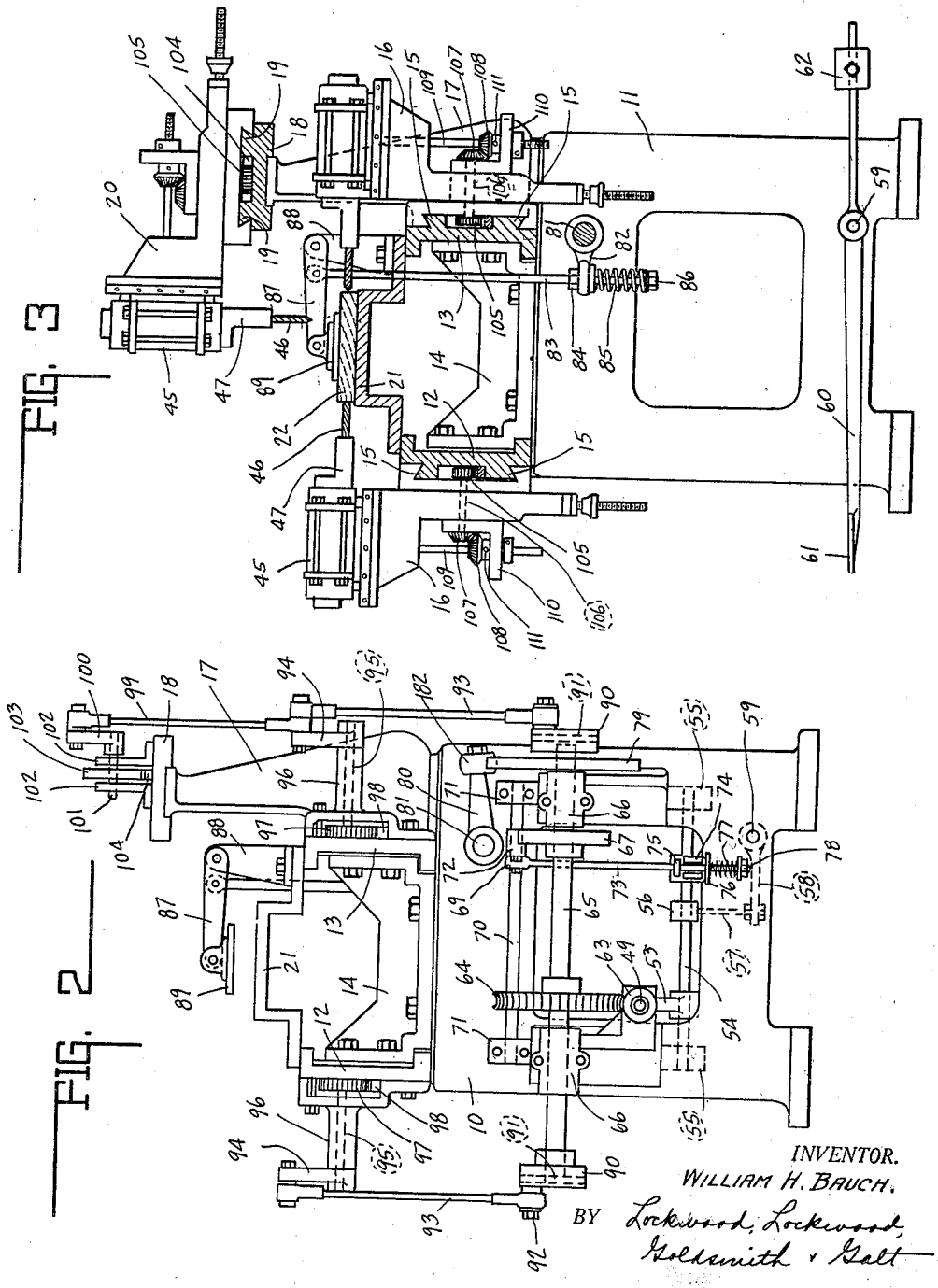

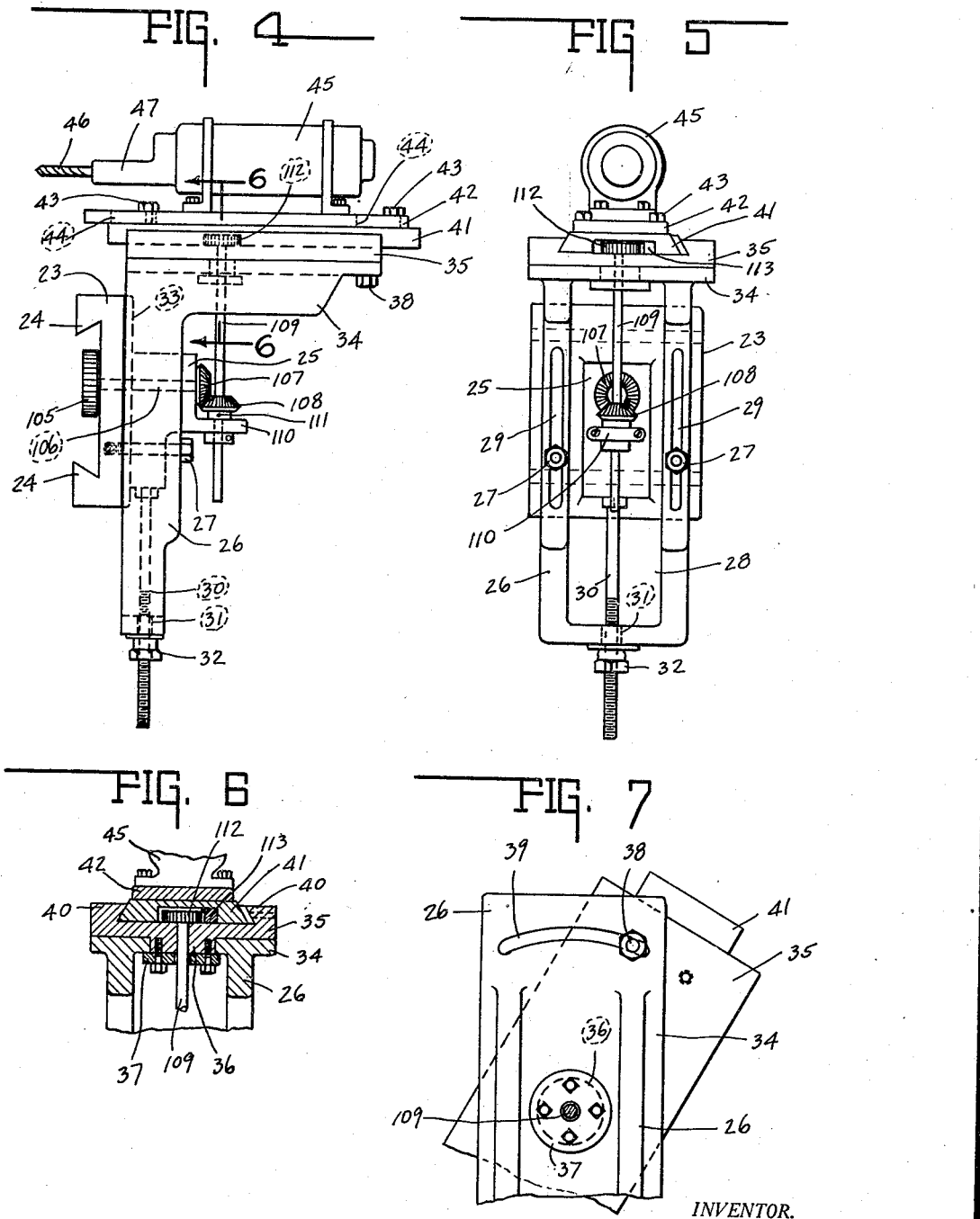

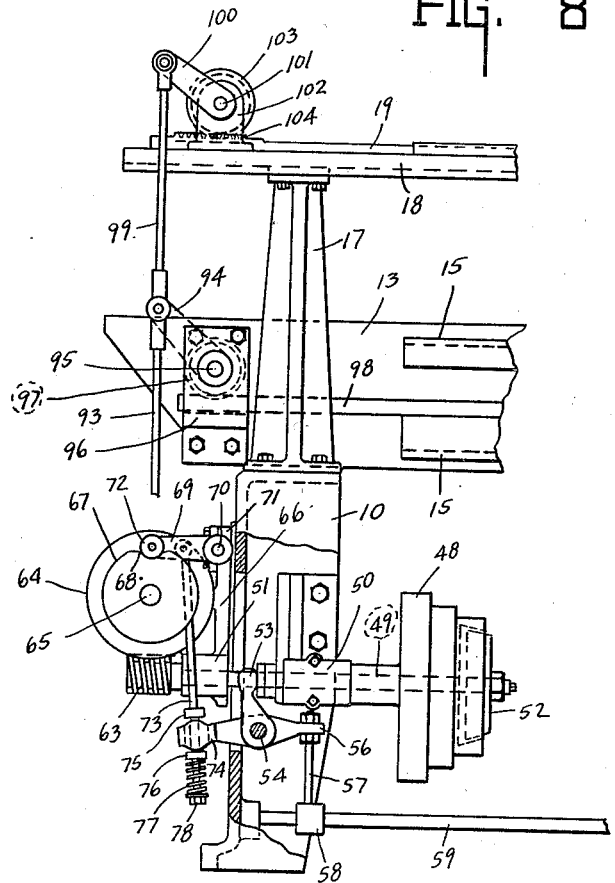
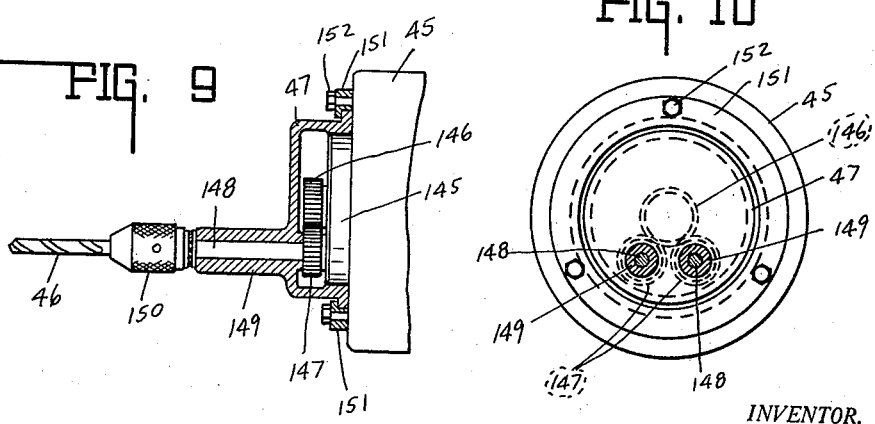

1,860,700

UNITED STATES PATENT OFFICE

WILLIAM H. BAUCH, OF SHELBYVILLE, INDIANA, ASSIGNOR TO INDIANA FOUNDRY, MACHINE & SUPPLY COMPANY, OF BRAZIL, INDIANA, A CORPORATION

MACHINE TOOL

Application filed December 19, 1929. Serial No. 415,198.

This invention relates to a machine tool wherein a plurality of rotary working tools are used simultaneously to operate upon a piece of material. Such tools may be drills, milling cutters, polishers, grinders or similar rotary tools.

The principal object of the invention is to provide an extremely flexible apparatus wherein the working tools may be adjusted to many desired positions with respect to the work with the minimum loss of time.

Another object of the invention is to construct a machine of the character described which can be economically built.

The principal feature of the invention resides in the provision of independent working tool units each having an independent motive power for rotating the working tool and each adjustable upon the frame of the machine to many desired positions and angles of attack. While the said units are provided with independent power means for rotating each tool, a common power drive is provided for simultaneously advancing all of the said tools toward the piece of material to be operated upon and for simultaneously retracting the same therefrom.

Another feature of the invention resides in the particular form of the advancing and retracting mechanism used.

Another feature of the invention resides in the operating mechanism whereby the advancing of the tools is initiated.

Still another feature of the invention resides in the specific construction of the individual working tool units, and the method of connecting the working tools to their respective motors.

In the drawings and following description the invention is illustrated as applied to a multiple spindle drill press. However, this description is to be understood to be illustrative only and not intended as a limitation of the invention to such use.

Other objects and features and the full nature of the invention will be apparent from the following specifications and claims and the attached drawings.

Fig. 1 is a front elevational view of the machine. Fig. 2 is an end elevational view of the same. Fig. 3 is a sectional view taken on the line 3—3 of Fig. 1. Fig. 4 is a side view of one of the individual working tool units. Fig. 5 is a rear view of the same. Fig. 6 is a sectional view taken on the line 6—6 of Fig. 4. Fig. 7 is a fragmentary view of a portion of the adjusting mechanism of the working tool unit. Fig. 8 is a fragmentary rear elevational view of the machine with parts cut away to show other parts in detail. Fig. 9 is a sectional view illustrating the method of attaching the working tools to their individual motors. Fig. 10 is a sectional view taken on the line 10—10 of Fig. 9.

A pair of end frame members 10 and 11 support longitudinal frame members 12 and 13, herein shown as substantially channel shaped in section. At each end of the machine a casting 14 rests upon the frame members 10 and 11 and is bolted to the frame members 12 and 13 to provide the necessary stiffness to the structure. Each of the members 12 and 13 carries upon its outer face a pair of dove-tailed guide ways 15 adapted to slidably support a plurality of working tool units each indicated generally by the numeral 16. At each end of the machine a vertical frame member 17 rests upon the members 10 and 11 and a longitudinal frame member 18 is supported thereby. The frame member 18 carries upon its upper surface a pair of dove-tailed guide members 19. A plurality of working tool units 20 similar in every respect to the units 16 are slidably supported upon the frame member 18 and are guided by the dove-tailed members 19. A plurality of cross members 21 are supported upon the frame members 12 and 13 and serve to support a piece of material 22 to be operated upon.

Each of the working tool units 16 and 20 includes a supporting member 23 having dove-tailed jaws 24 adapted to engage the guide members 15 or 19 and having a rearwardly extending portion 25. A casting 26 is fastened to the member 23 by means of bolts 27. The rearwardly extending portion 25 of the casting 23 extends through an opening 28 in the casting 26 and the bolts 27 extend through slotted openings 29 in the said casting.

A rod 30 threadedly engages the portion 25 of the casting 23 and extends downwardly therefrom through an opening 31 in the lower portion of the casting 26. A nut 32 threadly engages the lower end of said rod. By this construction the bolts 27 may be loosened and the casting 26 may be moved with reference to the casting 23 by manipulation of the nut 32. In the moving of the said casting, it is guided by means of shoulders 33 formed on the casting 23 and extending into the opening 28.

Each of the castings 26 has a rearwardly extending portion 34 upon which is mounted a casting 35. The casting 35 has a circular portion 36 projecting through an opening in the casting 26. A flange 37 is bolted to the said portion 36 and serves to retain the casting 35 in position with respect to the casting 26. The circular portion 36 serves as a pivot about which the casting 35 may be rotated with respect to the casting 26. A bolt 38 extends through an arcuate opening 39 in the casting 26 and threadedly engages the casting 35 for maintaining the said casting at any desired angle with respect to the casting 26.

The casting 35 carries dove-tailed guideways 40 adapted to engage and slidably retain a dove-tailed member 41. A motor base casting 42 is bolted to the dove-tailed member 41 by means of bolts 43 extending through slotted holes 44 in the said motor base casting 42. The holes 44 extend parallel with the sliding motion of the dove-tailed member 41 upon the casting 35. The said motor base may, therefore, be adjusted to a desired position in the said direction maintained in said position by tightening the bolts 43.

The motor base 42 carries an electric motor 45, in turn carrying a drilling tool 46. The motor 45 serves to rotate the tool 46. Each of the drilling tools 46 projects toward the piece of material 22 to be operated upon and by means of the adjustable features just described may be positioned in many desired positions with respect thereto.

The tools 46 are preferably attached to the motor 45 by means of a removable adaptor 47 illustrated particularly in Figs. 9 and 10. In these figures the housing of the motor 45 terminates in a cylindrical portion 145 about which is closely fitted the body of the adaptor 47. The shaft of the motor carries a gear 146 meshing with a pair of gears 147 each carried upon a spindle 148 journalled in an extended portion 149 of the adaptor 47. The drills 46 are fastened to the spindles 148 by means of a well known form of chuck 150. The adaptor 47 is clamped to the casing of the motor 45 by means of a clamp ring 151 secured by bolts 152. By loosening the bolts 152 the adaptor may be rotated to bring the drill centers to any desired angular position with respect to each other thus greatly increasing the flexibility and usefulness of the machine. If desired adaptors may be supplied with any convenient number of tool spindles and with various distances between tool centers.

For advancing and retracting the working tools, power is applied to a cone pulley 48 by means of an electric motor and belt, not shown, or by other suitable means. The cone pulley 48 is freely carried upon a shaft 49 supported upon bearings 50 and 51 carried upon the frame member 10. The shaft 49 carries a clutch member 52 positioned within the cone pulley 48 and adapted to engage therewith. The said clutch member is splined to the said shaft and may be moved into engaging position by means of a lever 53 mounted upon a shaft 54. Thus, the cone pulley 48 may be continually rotated and the power applied to the shaft 49 only when the lever 53 is operated to engage the clutch.

The shaft 54 is supported upon bearings 55 upon the frame member 10 and carries a lever 56 connected by means of a link 57 with a lever 58 carried upon a shaft 59. The shaft 59 extends longitudinally of the machine and is supported upon suitable bearings on the frame members 10 and 11. At a point intermediate of said frame members, the shaft 59 carries a lever 60 fitted with a foot treadle 61. A counterweight 62 is attached to the said lever and serves normally to maintain the foot treadle in its upper position. By this means the operation of the foot treadle serves to engage the clutch 52 for applying power to the shaft 49.

The shaft 49 carries a worm 63 engaging a worm wheel 64 carried upon a shaft 65, in turn supported upon suitable bearings 66 upon the frame member 10. The said shaft likewise carries a cam member 67 substantially circular in form and having a single depression 68 therein. A lever 69 is carried upon a shaft 70 supported upon suitable bearing members 71 carried by the frame member 10. The lever 69 carries a roller 72 adapted to engage the periphery of the cam 67. A link 73 is pivotally fastened to the lever 69 and extends downwardly through an opening in the outer end of a lever member 74 carried upon the shaft 54. The link 73 carries a collar member 75 fixedly attached thereto and adapted to engage the upper surface of said lever. A collar member 76 is freely carried by the said link and is adapted to engage the lower surface of the lever 74. A compression spring 77 is interposed between the collar 76 and a nut 78 threadedly engaging the lower end of the link 73.

As will be hereinafter described the shaft 65 is adapted to make a single rotation for each advancement and retraction of the working tools 46. By this construction, therefore, the operation of the foot treadle 61 engages the clutch for applying power to the shaft 49. The resulting motion of the shaft 65 and the cam 67 carried thereby elevates the roller 72 from the cam depression 68, thus causing the collar 76 to engage the lever 74, by means of the pressure of the spring 77, for maintaining the clutch in engaging position until a complete revolution of shaft 65 has been made. Upon the completion of the said revolution the roller 72 again drops into the depression 68 and the clutch is thereby disengaged until the foot treadle 61 is again depressed. By this means a momentary operation of the foot treadle initiates a complete advance and retraction of the working tools and the said tools automatically stop in the retracting position.

The shaft 65 carries a cam member 79 having a single depression therein similar to the depression 68 in cam 67. A lever member 80 is supported upon a shaft 81 and carries a roller 182 adapted to engage the periphery of the cam 79. The shaft 81 extends longitudinally of the machine and is suitably supported upon the frame members 10 and 11.

A plurality of lever members 82 are carried upon the shaft 81 and a rod 83 extends upwardly through a hole in the outer end of each of said levers. The rods 83 are fitted with fixed collar members 84 engaging the upper surface of said levers and with compression springs 85 engaging the lower surface thereof. The springs 85 are maintained in engaging position by nuts 86 threadedly engaging the lower end of said rods. Each of said rods is pivotally connected at its upper end to a lever 87. Each of said lever members is, in turn pivotally mounted upon a bracket 88 supported upon one of the cross members 21. Each of the levers 87 carries at its outer end a clamping member 89 adapted to engage the upper surface of the piece of material 22 to be operated upon for clamping the same to the cross members 21. By this construction the rotation of shaft 65, when the foot treadle 61 is operated, elevates the roller 182 from the notch in cam 79 thus giving a rotation to shaft 81 sufficient to bring the clamping members 89 into clamping position. The springs 85 serve as yielding members for substantially equal distribution of the clamping force to the several clamping members. Upon the completion of a revolution of shaft 65, the roller 182 again enters the notch in cam 79 and the said clamping members are released for removal of the work 22 and replacement thereof by another piece.

The shaft 65 carries at each end a disk 90 having a T-slot 91 therein. A T-bolt 92 engages each of the T-slots in a well known manner and each T-bolt serves as a pivotal connection for a vertical pitman 93. By means of the T-bolt construction, the pitman connection may be adjusted to give an oscillating movement of a desired amplitude to the pitman. The upper end of each pitman is connected to a lever 94 carried upon a shaft 95. Each of the shafts 95 is supported upon a bracket member 96 and the said bracket members are in turn supported upon the longitudinal frame members 12 and 13, respectively. Each of the shafts 95 carries a spur gear 97 adapted to engage a rack 98. The racks 98 are supported upon the dove-tailed guide-ways 15 and are free for longitudinal movement with respect thereto. A pitman 99 is attached to the lever 94 at the rear of the machine and extends upwardly to a pivotal connection with a lever 100. The lever 100 is supported upon a stub shaft 101, in turn carried by bracket members 102 supported upon the longitudinal frame member 18. Between the brackets 102, the shaft 101 carries a spur gear 103 adapted to engage a rack 104. The rack 104 is supported upon the frame member 18 and is positioned between the dove-tailed guide-ways 19 and is free for longitudinal movement with respect to said frame member.

By this construction, a single revolution of the shaft 65 serves to impart a single forward and backward movement to each of the racks 98 and the rack 104. The amplitude of said movement may be adjusted by means of the T-bolt and slot adjustment for the pinion 93.

Each of the working tool units 16 and 20 is fitted with a spur gear 105 adapted to engage one of the racks 98 or 104. In each of the said units, the gear 105 is supported upon a shaft 106 carried upon the casting 23 and carries at its opposite end a bevel gear 107. The bevel gear 107 engages a bevelled gear 108 carried upon a shaft 109. The shaft 109 is journalled at one end in the circular portion 36 of the casting 35 and is co-axial with said circular portion. The said shaft is journalled adjacent the other end in a projecting portion 110 of the casting 23. The bevel gear 108 is fixed to the said shaft by means of a set screw 111. The shaft 109 carries a spur gear 112 adapted to engage a rack 113 fixedly carried by the dove-tailed member 41. By means of this construction the reciprocating motion of the racks 98 and 104 previously described is transmitted to the dove-tailed member 41 for advancing and retracting the said member and the motor and tool carried thereby in the direction of the axis of said motor and tool.

In the positioning of the tool units, the set screw 111 is removed from the gear 108. The entire tool unit may then be moved along the frame members 12, 13 or 18 to any desired position without advancing and retracting movement of the tools. Similarly, the casting 26 may be moved upon the casting 23, the casting 35 may be rotated upon the casting 26 and the motor base 42 may be adjusted upon the dove-tailed member 41. When the said adjustments are complete the set screw 111 is replaced and the machine is ready for operation.

It is to be understood that numerous departures from the details of the machine herein described may be made without departure from the spirit and scope of the invention as defined in the following claims.

The invention claimed is:

1. In a machine tool, the combination of a frame having a guideway formed thereon, a carriage slidably adjustable upon said guideway, a substantially L-shaped member supported by said carriage and having one of its legs engaging said carriage and slidably adjustable thereon in a direction transverse to the direction of adjustment of the carriage upon the guideway, a member rotatably mounted upon the second leg of said L-shaped member, a motor base slidably mounted upon said rotatably mounted member, a rotary tool and motor unit fastened to said motor base, a movable member mounted upon said frame, and connecting means between said member and said motor base for sliding the latter upon said rotatable member, said means being operable irrespective of the adjusted position of said carriage upon said guideway, and said L-shaped member upon said carriage and irrespective of the rotated position of said rotatable member.

2. In a machine tool, the combination of a frame having a guideway formed thereon, a carriage slidably adjustable upon said guideway, a substantially L-shaped member supported by said carriage and having one of its legs engaging said carriage and slidably adjustable thereon in a direction transverse to the direction of adjustment of the carriage upon the guideway, a member rotatably mounted upon the second leg of said L-shaped member, a motor base slidably mounted upon said rotatably mounted member, a rotary tool and motor unit fastened to said motor base, a movable member mounted upon said frame, a rack slidable upon said frame in the direction of adjustment of said carriage, a shaft carried by said carriage, a gear on said shaft engaging said rack, a second shaft transverse to said first shaft and at least partially supported upon said L-shaped member, bevel gears connecting said shafts, a gear carried upon said second shaft and concentric with the axis of rotation of said rotatable member, and a rack carried by said motor base and engaging said last-mentioned gear.

3. In a machine tool, the combination of a frame having a guideway formed thereon, a carriage slidably adjustable upon said guideway, a susbtantially L-shaped member supported by said carriage and having one of its legs engaging said carriage and slidably adjustable thereon in a direction transverse to the direction of adjustment of the carriage upon the guideway, a member rotatably mounted upon the second leg of said L-shaped member, a motor base slidably mounted upon said rotatably mounted member, a rotary tool and motor unit fastened to said motor base, a movable member mounted upon said frame, a rack slidable upon said frame in the direction of adjustment of said carriage, a shaft carried by said carriage, a gear on said shaft engaging said rack, a second shaft transverse to said first shaft and at least partially supported upon said L-shaped member, bevel gears connecting said shafts, a gear carried upon said second shaft and concentric with the axis of rotation of said rotatable member, a rack carried by said motor base and engaging said last-mentioned gear, one of said gears being detachably secured to its shaft to permit adjustment of said carriage upon said guideway, said L-shaped member upon said carriage, said rotatable member upon said L-shaped member and said motor base upon said rotatable member.

In witness whereof, I have hereunto affixed my signature.

WILLIAM H. BAUCH.